(12) United States Patent
Tsaur et al.

(10) Patent No.: US 9,932,231 B2
(45) Date of Patent: Apr. 3, 2018

(54) AIR-PERMEABLE TEXTURE PROVIDING OXYGEN AND NEGATIVE OXYGEN IONS

(71) Applicants: Garry Tsaur, Rowland Heights, CA (US); Frank Tsaur, Rowland Heights, CA (US); Ting-Hua Wang, Taichung (TW)

(72) Inventors: Garry Tsaur, Rowland Heights, CA (US); Frank Tsaur, Rowland Heights, CA (US); Ting-Hua Wang, Taichung (TW)

(*) Notice: Subject to any disclaimer, the term of this patent is extended or adjusted under 35 U.S.C. 154(b) by 191 days.

(21) Appl. No.: 14/791,472

(22) Filed: Jul. 5, 2015

(65) Prior Publication Data

US 2017/0001864 A1    Jan. 5, 2017

(51) Int. Cl.
| | | |
|---|---|---|
| *C01B 13/02* | (2006.01) | |
| *C01B 13/08* | (2006.01) | |
| *C01B 13/00* | (2006.01) | |
| *A41D 13/00* | (2006.01) | |
| *A41D 13/11* | (2006.01) | |

(52) U.S. Cl.
CPC ...... *C01B 13/0296* (2013.01); *A41D 13/1107* (2013.01); *C01B 13/08* (2013.01); *C01B 13/086* (2013.01); *A41D 2400/20* (2013.01); *A41D 2400/60* (2013.01)

(58) Field of Classification Search
CPC ............ A41D 13/1107; A41D 2400/20; A41D 2400/60; C01B 13/08; C01B 13/086; C01B 13/0296
See application file for complete search history.

(56) References Cited

U.S. PATENT DOCUMENTS

| 4,963,327 | A | * | 10/1990 | Russell | .................... | A62B 7/08 |
| | | | | | | 128/202.26 |
| 2008/0258347 | A1 | * | 10/2008 | Li | ......................... | D06M 11/74 |
| | | | | | | 264/430 |
| 2013/0038111 | A1 | * | 2/2013 | Huang | .................. | B60N 2/4415 |
| | | | | | | 297/391 |
| 2016/0262466 | A1 | * | 9/2016 | Tsaur | .................. | A41D 13/1107 |
| 2017/0281418 | A1 | * | 10/2017 | Tsaur | .................. | A61F 13/4758 |

* cited by examiner

*Primary Examiner* — Joseph D Anthony
(74) *Attorney, Agent, or Firm* — Bruce Stone LLP; Joseph Bruce

(57) ABSTRACT

The present disclosure describes an air-permeable texture providing oxygen and negative oxygen ions which comprises substances supplying oxygen and substances supplying negative ions and is embedded into several household articles or devices such as band-aids, dressings over wounds, masks, clothes, air conditioners or air purifiers.

6 Claims, 4 Drawing Sheets

AIR-PERMEABLE TEXTURE PROVIDING OXYGEN AND NEGATIVE OXYGEN IONS

BACKGROUND OF THE INVENTION

1. Field of the Invention

The present disclosure relates to an air-permeable texture, particularly an air-permeable texture providing oxygen and negative oxygen ions.

2. Description of the Prior Art

The industrialization and the increase in population density have increased environmental pollution and deteriorated air quality, particularly through the increase in carbon dioxide and decrease in oxygen levels in confined interior spaces or populous areas. In this regard, a person suffering from an oxygen deficiency will feel fatigued and could develop cerebral lesions. Therefore, how to supply the human body with more oxygen has become an ever increasing public concern.

The negative oxygen ion is the oxygen ion with one or more negative charges. Air consists of main gas components such as nitrogen (78%), oxygen (21%), carbon dioxide (0.03%) and water vapor. Among these gas components, oxygen and carbon dioxide rather than nitrogen feature electron affinity. Oxygen expresses 700 times greater electron affinity than carbon dioxide and can be induced to create atmospheric negative oxygen ions in a process in which oxygen molecules in the air combine with free electrons.

Air molecules under high pressures or powerful electromagnetic fields such as electric discharge phenomenon (lightning), the photoelectric effect, or a fountain and waterfall effect, will lose part of their outermost electrons thereby becoming ionized. Those outermost electrons that are shed from the pull of the nuclei are called free electrons and posses negative charges. Negative oxygen ions are most often generated by atmospheric ionized free electrons caught by the oxygen molecule.

Depending on the air quality, the number of negative oxygen ions in the ambient atmosphere is changeable at any moment. For example, there are 10,000-20,000 negative oxygen ions per cubic centimeter around a waterfall, 5,000-10,000 negative oxygen ions per cubic centimeter in a forest or on a beach, 200-1,000 negative oxygen ions per cubic centimeter in an urban park, 100-400 negative oxygen ions per cubic centimeter in a naturally ventilated office and almost no negative oxygen ion in a closed office. People living in an environment in which more than 1,000 negative oxygen ions per cubic centimeter exist will feel comfortable.

Negative oxygen ions are indispensable to metabolism. The quality and quantity of oxygen ions directly affect metabolism in the human body according to research performed by Setsuo Lino, a Japanese scientist. The ionization rates of calcium and sodium in the blood will rise with more negative oxygen ions added into blood; the increased ionization rates contribute to weakly alkaline blood which is favorable to nutrients absorbed by and degraded wastes discharged from the human body, purification of blood, and human health.

Tourmaline generates currents by which an electric field induced around tourmaline electrolyzes moisture therein for generation of "tourmaline-induced negative ions" that are identical to "negative ions" naturally produced in a waterfall or a forest and used to adjust ionic equilibrium in the human body. Negative ions with functions such as relaxing psychosomatic conditions, activating cells and promoting natural healing can inhibit oxidation of the human body or postpone degradation. Moreover, negative ions have other functions such as deodorization, dehumidification and anti-microbial effects.

It is imperative to keep air quality of interior spaces in which people usually live and stay for 80% of a whole day. Therefore, it is a critical issue to design brand-new air-permeable texture providing oxygen and negative oxygen ions based on air-permeable texture and installed in a variety of devices for better air quality without the supply of electricity.

SUMMARY OF THE INVENTION

Existing devices in the market that providing oxygen or negative oxygen ions are generally specialized equipment, expensive, and consume electricity, the patent applicant researched and developed an air-permeable texture that provides oxygen and negative oxygen ions which are generated without support of any aerodynamic effect for better air quality of micro-environment inside the air-permeable texture.

The present disclosure describes a texture providing oxygen and negative oxygen ions which comprises substances supplying oxygen and substances supplying negative ions; the substances supplying oxygen generates oxygen for an increased concentration of oxygen in micro-environment; the substances supplying negative ions generate negative ions; the negative ions combine oxygen for generation of negative oxygen ions.

For this purpose, the substances supplying oxygen comprise metal peroxide or metal superoxide.

For this purpose, the metal peroxide can be a combination of magnesium peroxide, potassium peroxide, sodium peroxide and calcium peroxide.

For this purpose, the metal superoxide comprises potassium superoxide or sodium superoxide.

For this purpose, the substances supplying negative ions can be tourmaline.

For this purpose, the substances supplying oxygen are powdered, fine granulated or fibered substances.

For this purpose, the substances supplying negative ions are powdered, fine granulated or fibered substances.

For this purpose, a texture providing oxygen and negative oxygen ions coordinates with air-permeable materials in which both the substances supplying oxygen and the substances supplying negative ions are wrapped.

For this purpose, a texture providing oxygen and negative oxygen ions is based on air-permeable texture with substances supplying negative ions in which the texture supplying oxygen is wrapped.

For this purpose, a texture providing oxygen and negative oxygen ions can be used in several household articles or devices.

For this purpose, the household articles or devices can be band-aids, dressings over wounds, masks, clothes, air conditioners or air purifiers.

DETAILED DESCRIPTION OF THE PREFERRED EMBODIMENT

An air-permeable texture providing oxygen and negative oxygen ions is explained in but not limited to the following embodiments.

Figure 1:
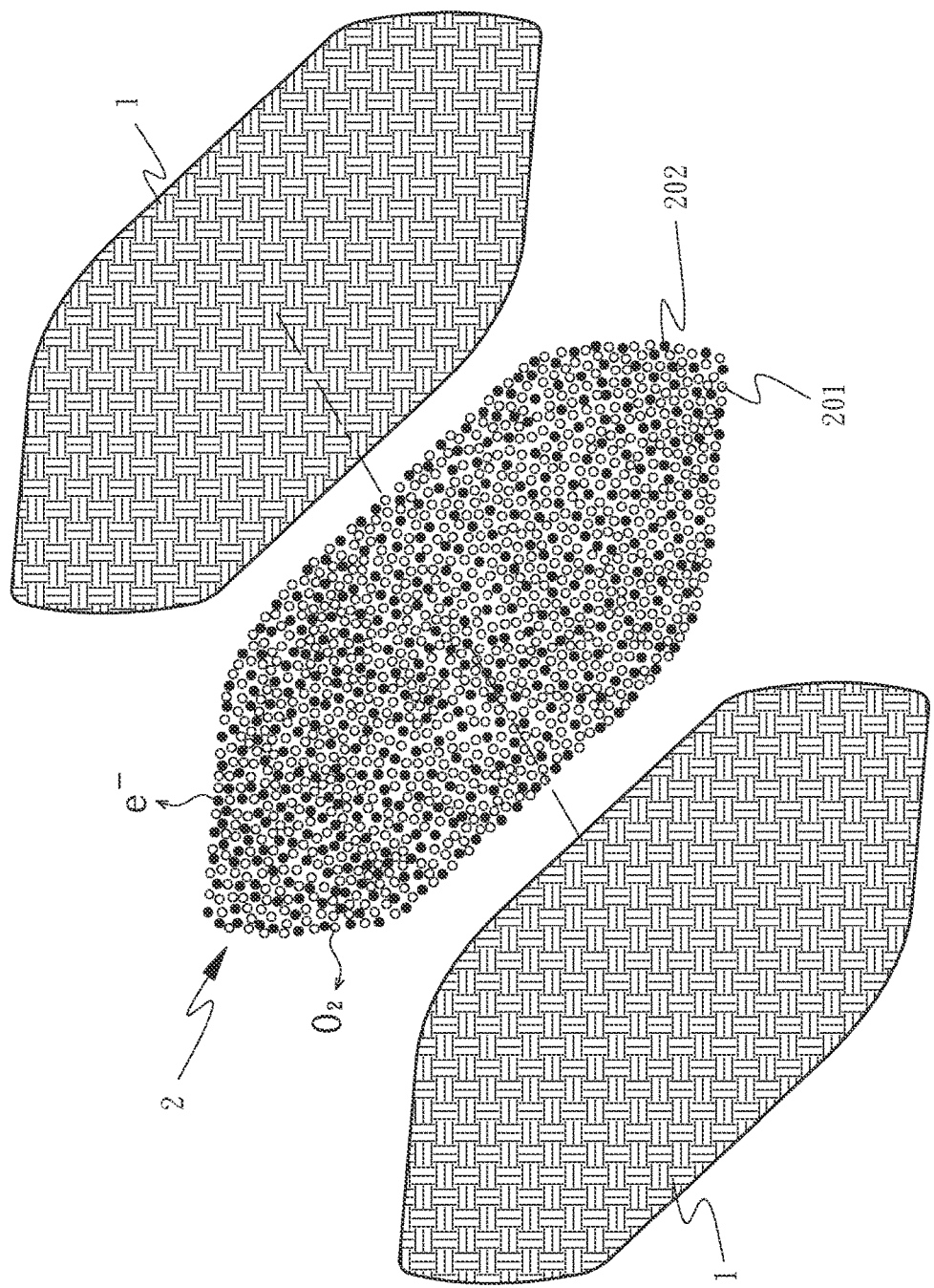
FIG. 1 is a schematic view that illustrates a texture providing oxygen and negative oxygen ions comprised of substances supplying oxygen and substances supplying negative ions, wrapped in air-permeable materials.
Figure 2:
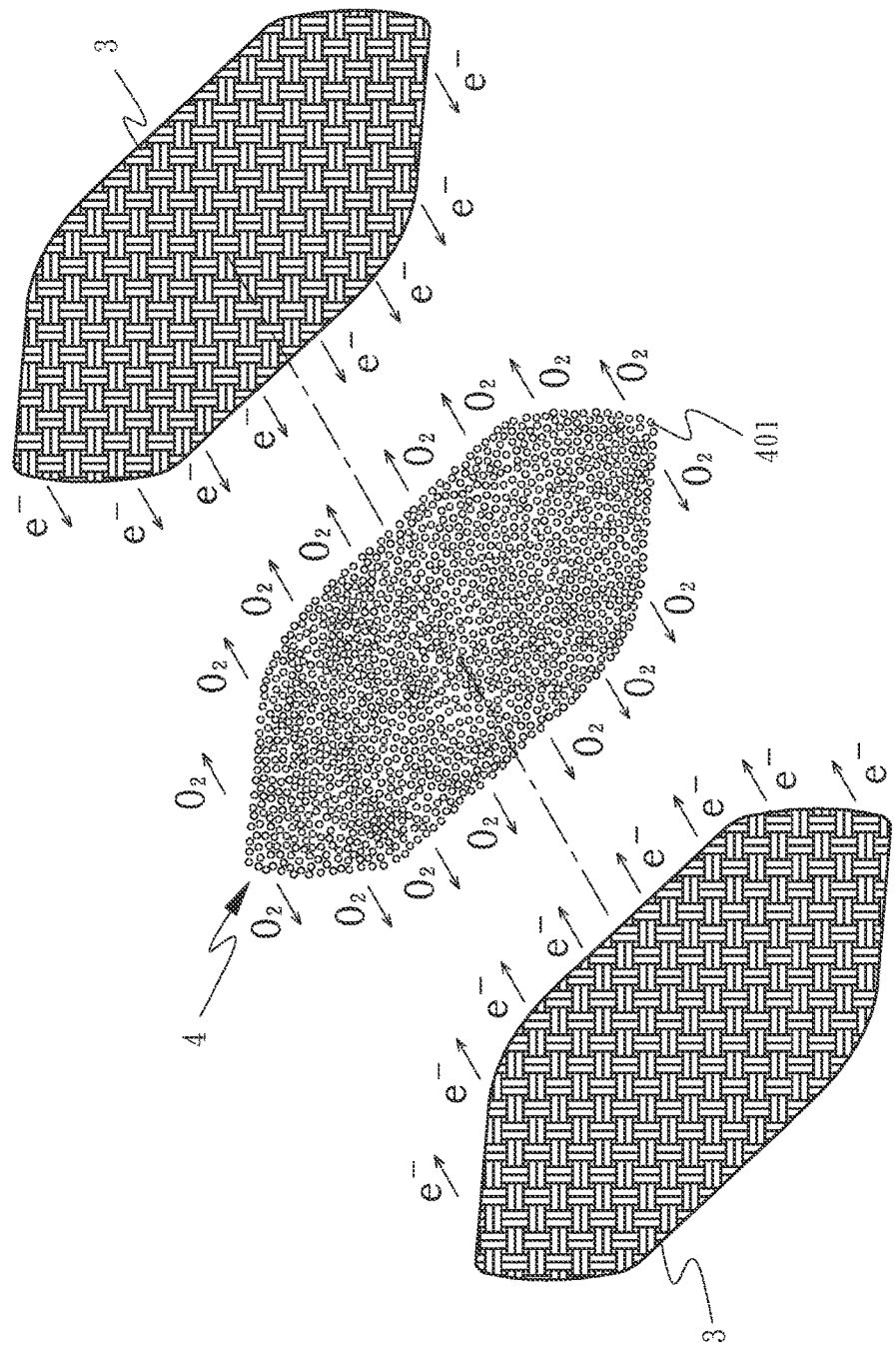
FIG. 2 is a schematic view that illustrates a texture supplying oxygen wrapped in air-permeable texture with substances supplying negative ions.
Figure 3:
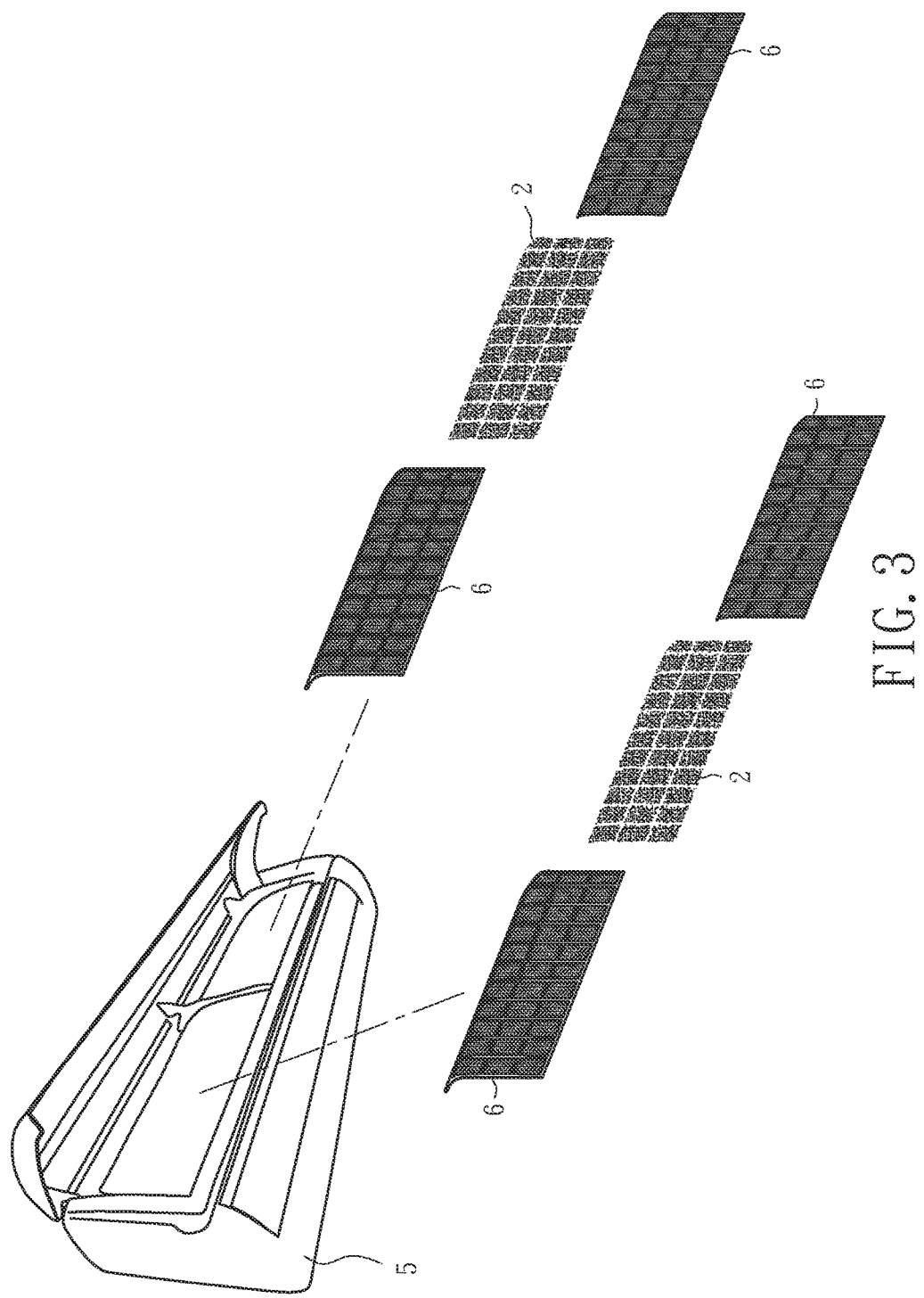
FIG. 3 is a schematic view that illustrates a texture providing oxygen and negative oxygen ions is embedded into a filter screen of an air conditioner in a preferred embodiment.
Figure 4:
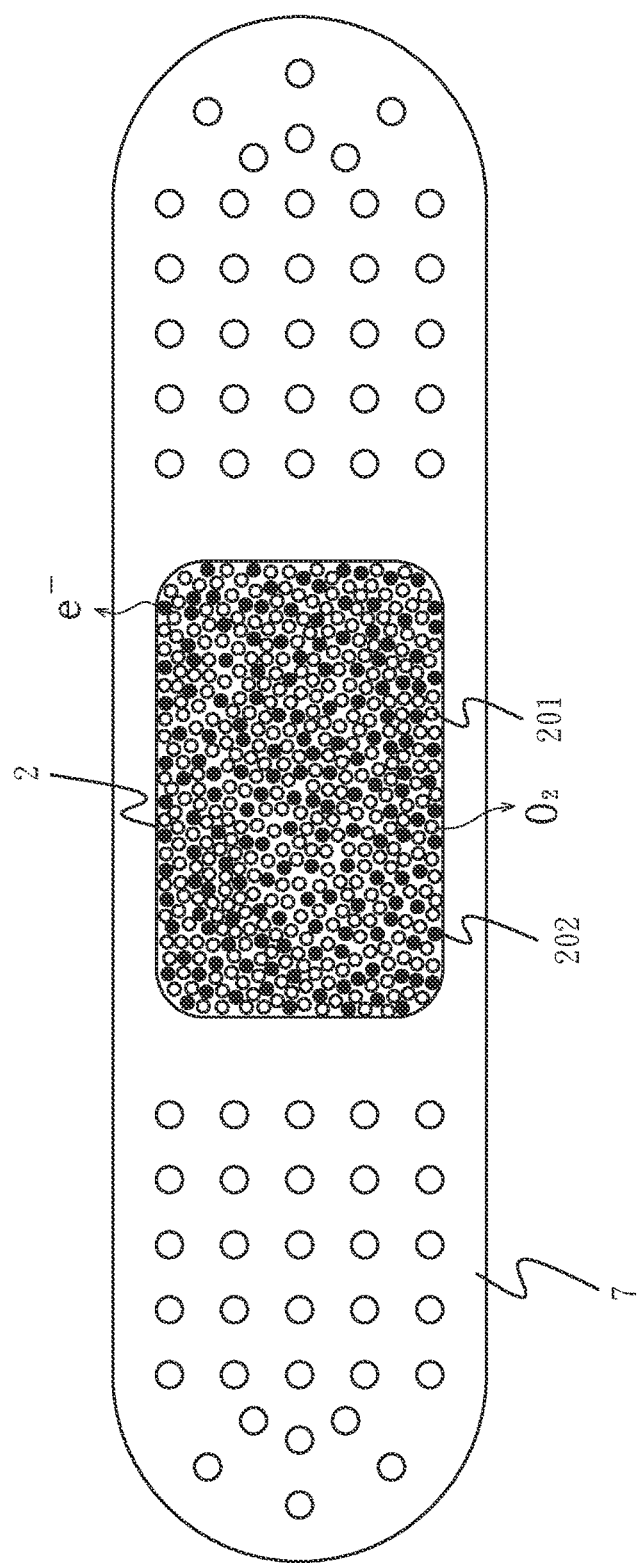
FIG. 4 is a schematic view that illustrates a texture providing oxygen and negative oxygen ions embedded into an inner layer of a band-aid in a preferred embodiment.

The present disclosure describes an air-permeable texture providing oxygen and negative oxygen ions for generation of oxygen and negative oxygen ions, as shown in FIGS. 1 and 2. Referring to FIG. 1 which illustrates a texture providing oxygen and negative oxygen ions (2) wrapped in air-permeable materials (1) comprises substances supplying oxygen (201) as well as substances supplying negative ions (202); alternatively, referring to FIG. 2 which illustrates a texture supplying oxygen (4) wrapped in air-permeable texture with substances supplying negative ions (3) comprises substances supplying oxygen (401); oxygen generated by the materials supplying oxygen (201, 401) further combines negative ions generated by the materials supplying negative ions (202, 3) for generation of negative oxygen ions. As shown in FIGS. 3 and 4, the texture providing oxygen and negative oxygen ions is embedded into a filter screen (6) of an air conditioner (5) or an inner layer of a band-aid for increased concentrations of oxygen and negative oxygen ions inside micro-environment.

Embodiment 1
Chemical reaction of magnesium peroxide in atmospheric moisture for generation of oxygen:

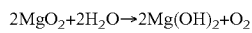
$$2MgO_2+2H_2O \rightarrow 2Mg(OH)_2+O_2$$

Magnesium hydroxide and oxygen are produced when magnesium peroxide reacts with water. Therefore, the texture providing oxygen and negative oxygen ions contributes to decreasing ambient moisture and increasing oxygen which is produced when ambient moisture reacts with magnesium peroxide in the texture.

Embodiment 2
Chemical reaction of calcium peroxide in atmospheric moisture for generation of oxygen:

$$2CaO_2+2H_2O \rightarrow 2Ca(OH)_2+O_2$$

Calcium hydroxide and oxygen are produced when calcium peroxide reacts with water. Therefore, the texture providing oxygen and negative oxygen ions contributes to decreasing ambient moisture and increasing oxygen which is produced when ambient moisture reacts with calcium peroxide in the texture.

Embodiment 3
Chemical reaction of potassium peroxide in atmospheric moisture for generation of oxygen:

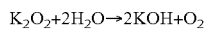
$$K_2O_2+2H_2O \rightarrow 2KOH+O_2$$

Potassium hydroxide and oxygen are produced when potassium peroxide reacts with water. Therefore, the texture providing oxygen and negative oxygen ions contributes to decreasing ambient moisture and increasing oxygen which is produced when ambient moisture reacts with potassium peroxide in the texture.

Embodiment 4
Chemical reaction of potassium superoxide in atmospheric moisture:

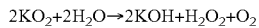
$$2KO_2+2H_2O \rightarrow 2KOH+H_2O_2+O_2$$

Potassium hydroxide and oxygen are produced when potassium superoxide reacts with water. Therefore, the texture providing oxygen and negative oxygen ions contributes to decreasing ambient moisture and increasing oxygen which is produced when ambient moisture reacts with potassium superoxide in the texture.

Embodiment 5
Chemical reaction of magnesium peroxide in moisture for generation of oxygen:

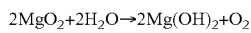
$$2MgO_2+2H_2O \rightarrow 2Mg(OH)_2+O_2$$

Magnesium hydroxide and oxygen are produced when magnesium peroxide reacts with water. Therefore, the texture providing oxygen and negative oxygen ions contributes to decreasing ambient moisture and increasing oxygen which is produced when water in transudatory biological fluid from a skin wound reacts with magnesium peroxide in the texture.

Embodiment 6
Reaction of negative charges in oxygen for generation of negative oxygen ions:

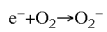
$$e^-+O_2 \rightarrow O_2^-$$

Negative oxygen ions are produced when negative charges are captured by oxygen molecules. Therefore, the texture providing oxygen and negative oxygen ions contributes to an increased concentration of ambient negative oxygen ions which are generated when negative charges from tourmaline reacts with oxygen in air.

The above descriptions are examples of preferred embodiments, which do not restrict the scope of an air-permeable texture providing oxygen and negative oxygen ions, and any equivalent change or modification without departing from the scope thereof should be covered in claims herein.

It can be seen from above descriptions an air-permeable texture providing oxygen and negative oxygen ions in the patent application meets patentability including novelty and non-obviousness.

What is claimed is:

1. A texture providing oxygen and negative oxygen ions comprising an oxygen generating substance and a negative ion substance; wherein the oxygen generating substance increase the concentration of oxygen within the texture; wherein the negative ion substance increase the concentration of negative ion within the texture; the negative ions combine oxygen for generation of negative oxygen ions; said texture providing oxygen and negative oxygen ions coordinates with air-permeable materials in which both the substances supplying oxygen and the substances supplying negative ions are enclosed; said texture providing oxygen and negative oxygen can be used in household articles, appliance, or devices; said household articles, applicants, or devices can be band-aids, dressings over wounds, masks, clothes, air conditioners or air purifiers.

2. A texture providing oxygen and negative oxygen ions according to claim 1 wherein the substances supplying oxygen comprise metal peroxide or metal superoxide.

3. A texture providing oxygen and negative oxygen ions according to claim 2 wherein the metal peroxide can be a combination of magnesium peroxide, potassium peroxide, sodium peroxide and calcium peroxide.

4. A texture providing oxygen and negative oxygen ions according to claim 1 wherein the substances supplying negative ions can be tourmaline.

5. A texture providing oxygen and negative oxygen ions according to claim 1 wherein the substances supplying oxygen are powdered, finely granulated or fibered substances.

6. A texture providing oxygen and negative oxygen ions according to claim 1 wherein the substances supplying negative ions are powdered, finely granulated or fibered substances.

* * * * *